Sept. 15, 1970 A. VAN DER LELY 3,528,612
TRANSPORTABLE DEVICES FOR SPREADING THICK-LIQUID
SUBSTANCES DURING TRAVEL OF THE DEVICES
Filed Oct. 16, 1967

INVENTOR
ARY VAN DER LELY
BY
Mason, Mason & Albright
Attorneys

United States Patent Office 3,528,612
Patented Sept. 15, 1970

3,528,612
TRANSPORTABLE DEVICES FOR SPREADING THICK-LIQUID SUBSTANCES DURING TRAVEL OF THE DEVICES
Ary van der Lely, 10 Weverskade,
Maasland, Netherlands
Filed Oct. 16, 1967, Ser. No. 675,396
Claims priority, application Netherlands, Nov. 5, 1966,
6615654
Int. Cl. B05b 9/04
U.S. Cl. 239—172                              8 Claims

ABSTRACT OF THE DISCLOSURE

A transportable spreader for spreading thick liquids having a container on a movable frame. At least one outlet nozzle or tube extends from adjacent the bottom of the container to a level of at least equal to the half-height of said container. The liquids are forced from the container through the tube. A spreading surface is located at the mouth of the tube to distribute the liquids in a fan-like fashion at an angle to the tube.

According to one aspect of the present invention there is provided a transportable device for spreading thick-liquid substances during travel of the device, the device comprising a container supported on a frame, at least one outlet tube extending up to at least half the height of the container, means for ejecting thick-liquid substance under pressure out of the container via the outlet tube, and means near the upper end of the tube for spreading the substance ejected from the tube in operation in fan-like fashion and at an angle to the tube.

According to another aspect of the present invention there is provided a transportable device for spreading thick-liquid substance during travel of the device, said device comprising a container supported on a frame, a spray nozzle serving as an outlet for the container whose width increases from its end nearest the container up to a width exceeding the width of the container, and means for ejecting thick-liquid substances under pressure out of the container via the spray nozzle.

For a better understanding of the invention and to show how the same may be carried into effect, reference will now be made, by way of example, to the accompanying drawings, in which.

Figure 1:
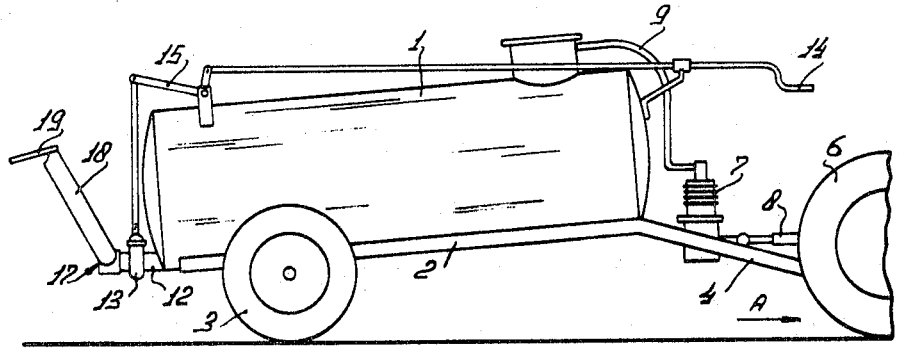
FIG. 1 is a side view of a transportable device for spreading thick-liquid substances on the ground during travel of the device.
Figure 2:
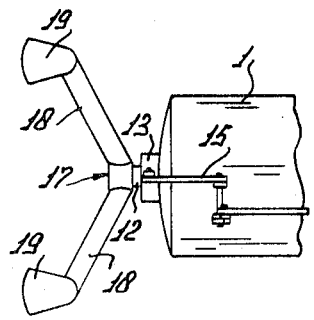
FIG. 2 is a plan view of the rear part of the device of FIG. 1.

The device shown in FIGS. 1 and 2 consists of a cylindrical container 1 mounted on a frame 2. The frame 2 is supported by two wheels 3 at the rear with respect to the operative travelling direction of the device, and by the apex of a triangular front piece 4 that in use is connected to the coupling attachment of a tractor 6. If desired, the frame 2 itself may have one or more supporting wheels at the front. On the front piece 4 of the frame 2 an air pump 7 is provided which is, in use, coupled with the power take-off shaft 8 of the tractor. In a form (not shown) the pump is alternatively coupled with a motor provided on the chassis 2. A high-level point of the container 1 communicates through a duct 9 with the pump 7. The duct 9 can be connected, by means of three-way cocks (not shown), at will with the suction side or the compression side of the pump 7, the side of the pump not connected with the duct 9 being caused to communicate with the open air.

At the rear of the container 1 an outlet 12 is provided at the bottom of the container 1, the container preferably being supported (as shown) so as to incline to the rear. The outlet is provided with a control-cock 13 for controlling liquid flow through the outlet. The control-cock 13 is actuated from the seal of the tractor by means of a screw spindle 14, by means of which a rod-system 15 connected to the cock 13 can be varied.

A spreading member 17 is connected to the end of the outlet 12 remote from the container 1 by means of a readily dismountable coupling. The spreading member 17 consists of at least one, and in the form shown two diverging, tube(s) or spray nozzle(s) 18, extending upwardly up to at least half the height of the container 1. A plate 19, extending substantially at right angles to the longitudinal center line of each spray nozzles 18, is provided at the free end of each of the spray nozzles 18. Each plate 19, which extends rearwardly and slightly in downward direction, is fastened to the edge of its associated spray nozzle 18 that is foremost viewed in the direction of operative travel and extends beyond the rear edge of its associated nozzle.

From FIG. 2 it will be seen that each plate 19 extends from its fastening point in a fan-like manner. In the form shown in FIGS. 3 and 4, which is otherwise similar to the form of FIGS. 1 and 2, the outlet 12 is provided with a single spray nozzle 20. This spray nozzle develops in a fan-like manner from its fastening point on the outlet 12 over a width exceeding that of the container 1, while it extends obliquely to the rear in upward direction. The spray nozzle 20 opens out in a slot-shaped mouth 21, which is substantially horizontal.

In operation of the first form of device shown in FIGS. 1 and 2, the device is moved in the direction of the arrow A by the tractor 6. Thick-liquid substance in the container is sprayed from the container against the plates 19, when the control-cock 13 is opened, via the spray-nozzles 18, so that the substance is spread in fan-like manner in a downward stream. The distance between the spray nozzles is such that the spreading zones touch each other or overlap each other. Although this is not shown, instead of two tubes or spray nozzles 18 the spreading member 17 may comprise only one tube or spray nozzle 18. The latter may be longer in order to enlarge the spreading zone of the material.

Figure 3:
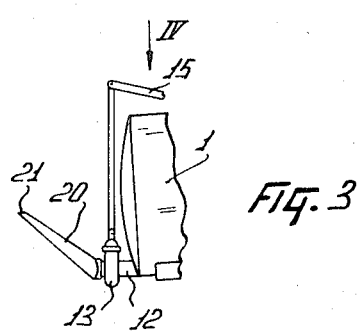
FIG. 3 is a side view of the rear part of a second form of transportable device for spreading thick-liquid substances on the ground during travel of the device.
Figure 4:
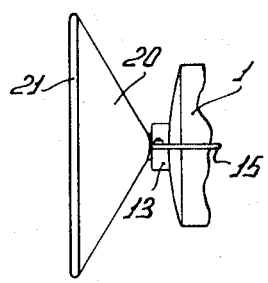
FIG. 4 is a plan view in the direction of arrow IV in FIG. 3 of the device of FIG. 3.

With the spray nozzle 20 of the device of FIGS. 3 and 4 substance is spread upwardly in fan-like manner, in operation, via the slot-shaped mouth 21.

Having thus described my invention, what I claim as new and desire to secure by letters patent of the United States is:

1. A transportable device for spreading thick-liquid substances during travel of the device, said device comprising a pressurized container supported on a frame, a single outlet opening adjacent the bottom of said container and outlet means with at least one exist mouth, extending upwardly from said outlet opening, said exit mouth being located at a level equal to at least half the height of said container and said outlet means extending upwardly adjacent the sides of said container, means for ejecting thick-liquid substances under pressure out of the opening of said container and up through the outlet means and said exit mouth, spreading means at said mouth for distributing the ejected substances in a fan-like fashion.

2. A device as claimed in claim 1, wherein said spreading means is a guide which extends substantially in a horizontal direction and said outlet means includes at least one tube which extends obliquely upwards to the rear of the device.

3. A device as claimed in claim 2, wherein said guide is located adjacent the exit mouth of said tube and said guide extends parallel to a plane that is at an angle of about 90° to the longitudinal center line of said tube.

4. A device as claimed in claim 3, wherein said guide is a plate which is secured to the front edge of the exit mouth of said tube.

5. A device as claimed in claim 4, wherein said plate spreads in fan-like manner from said front edge where said plate is secured towards the rear of the device.

6. A device as claimed in claim 2, wherein there are two outlet tubes spaced apart from each other, each of said tubes having a guide for spreading substances ejected therefrom, said tubes being arranged next to each other whereby the spreading zones of said tubes overlap each other.

7. A device as claimed in claim 1, wherein said exit mouth is a slot which extends substantially in a horizontal direction.

8. A device as claimed in claim 7, wherein said outlet means is a nozzle, the width of said nozzle increasing from said outlet opening to said slot, said nozzle extending from the container obliquely upwards to the rear of said device.

References Cited

UNITED STATES PATENTS 215,683   5/1879   Schanck _____ 239—172

FOREIGN PATENTS 813,512   5/1959   Great Britain.
948,745   9/1956   Germany.

M. HENSON WOOD, Jr., Primary Examiner

M. Y. MAR, Assistant Examiner

U.S. Cl. X.R.
239—521